(12) United States Patent
Boehm et al.

(10) Patent No.: US 6,635,133 B1
(45) Date of Patent: Oct. 21, 2003

(54) METHOD FOR MAKING A MULTILAYERED GOLF BALL

(75) Inventors: Herbert C. Boehm, Norwell, MA (US); William E. Morgan, Barrington, RI (US); Walter L. Reid, Mattapoisett, MA (US); Samuel A. Pasqua, Jr., Bristol, RI (US); Christopher Cavallaro, Attleboro, MA (US); Kevin M. Harris, New Bedford, MA (US); Jeffrey L. Dalton, North Dartmouth, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 09/482,336

(22) Filed: Jan. 14, 2000

Related U.S. Application Data

(60) Division of application No. 09/312,480, filed on May 17, 1999, which is a continuation of application No. 08/902,351, filed on Jul. 29, 1997, now abandoned, which is a continuation-in-part of application No. 08/615,346, filed on Mar. 11, 1996, now Pat. No. 5,683,312.

(51) Int. Cl.[7] .......................... B29C 35/02; B29C 43/18; A63B 37/08
(52) U.S. Cl. ...................... 156/146; 156/228; 156/245; 156/304.2; 264/248; 264/239; 264/250; 473/354
(58) Field of Search ................................. 473/354, 377, 473/351; 264/322, 250, 239, 248; 156/220, 146, 245, 304.2

(56) References Cited

U.S. PATENT DOCUMENTS

| | | |
|---|---|---|
| 698,515 A | 4/1902 | Kempshall |
| 878,070 A | 2/1908 | Kingzett et al. |
| 1,157,420 A * | 10/1915 | Roberts ................. 425/233 |
| 1,298,410 A | 3/1919 | Schüpphaus |
| 1,505,816 A | 8/1924 | Steele |
| 1,530,820 A | 3/1925 | Evans et al. |
| 1,568,513 A | 1/1926 | Lewis |
| 1,568,514 A | 1/1926 | Lewis |
| 1,591,117 A | 7/1926 | Floyd |
| 1,622,601 A | 3/1927 | Miller |
| 1,904,012 A | 4/1933 | Reichard |
| 2,998,977 A * | 9/1961 | Molitor ................. 473/354 |
| 3,350,252 A * | 10/1967 | Twickler ................. 156/228 |
| 3,616,101 A * | 10/1971 | Satchell et al. ........... 29/899.1 |
| 3,933,967 A | 1/1976 | Taylor |
| 4,408,980 A * | 10/1983 | Gallizia ................. 425/501 |
| 4,431,193 A | 2/1984 | Nesbitt |
| 4,564,199 A | 1/1986 | Adams |

(List continued on next page.)

FOREIGN PATENT DOCUMENTS

JP  11-76462  3/1999

*Primary Examiner*—Richard Crispino
*Assistant Examiner*—Sue A. Purvis
(74) *Attorney, Agent, or Firm*—Swidler Berlin Sheriff Friedman, LLP

(57) ABSTRACT

The invention provides a method for making a golf ball. Two cups are molded from an elastomer separately from an inner sphere. In one embodiment of the method, the cups are molded on both sides of a single mold part with hemispherical protrusions that form cavities in the cups. An inner sphere is placed within the cavities, and the cups are joined, by preferably crosslinking the cups together or applying adhesive there between. To retain the characteristics of the cup material where the cups meet, an embodiment of the cups can be formed with nonplanar mating surfaces that mesh with each other. The nonplanar mating surfaces preferably have a pattern that is symmetrical about the inner sphere, such as concentric ridges, for example a tongue and a groove.

12 Claims, 11 Drawing Sheets

U.S. PATENT DOCUMENTS

| | | |
|---|---|---|
| 4,919,434 A | 4/1990 | Saito |
| 4,943,332 A | 7/1990 | Sakaguchi et al. |
| 5,098,104 A | 3/1992 | Kane |
| 5,150,906 A | 9/1992 | Molitor et al. |
| 5,314,187 A | 5/1994 | Proudfit |
| 5,334,673 A | 8/1994 | Wu ................ 273/235 R |
| 5,439,227 A | 8/1995 | Egashira et al. |
| 5,467,994 A | 11/1995 | Moriyama et al. |
| 5,480,155 A | 1/1996 | Molitor et al. |
| 5,484,870 A | 1/1996 | Wu ......................... 528/28 |
| 5,683,312 A | 11/1997 | Boehm et al. |
| 5,836,831 A * | 11/1998 | Stanton et al. ............ 473/354 |
| 6,299,550 B1 * | 10/2001 | Molitor et al. ............ 473/354 |

* cited by examiner

METHOD FOR MAKING A MULTILAYERED GOLF BALL

This is a divisional of application Ser. No. 09/312,480, filed on May 17, 1999, which is a continuation of application Ser. No. 08/902,351, filed on Jul. 29, 1997 now abandoned, which is a continuation-in-part application of U.S. application Ser. No. 08/615,346, which was filed on Mar. 11, 1996, and is now U.S. Pat. No. 5,683,312. These applications and patent are expressly incorporated by reference herein in their entirety.

FIELD OF THE INVENTION

The present invention is directed to a method for making a golf ball. More particularly, the invention is directed to a method for making a multilayered golf ball having a plurality of core parts or cups arranged around a center and bound to each other by crosslinking or an adhesive.

BACKGROUND OF THE INVENTION

Generally, golf balls have been classified as two piece balls or three piece balls. Two piece balls are comprised of a solid polymeric core and a cover. These balls are generally easy to manufacture, but are regarded as having limited playing characteristics. Three piece balls are comprised of a solid or liquid-filled center surrounded by tensioned elastomeric material and a cover. Three piece balls generally have a good "click" and "feel" when struck by a golf club, but are more difficult to manufacture than two piece balls.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

The prior art is comprised of liquid filled golf balls. Wound golf balls have been made with liquid filled centers for many years. Both U.S. Pat. Nos. 1,568,513 and 1,904,012 are directed to wound golf balls with liquid filled centers. U.S. Pat. Nos. 5,150,906 and 5,480,155, are directed to a hollow spherical shell of a polymeric material which is filled with a liquid or unitary, non-cellular material that is a liquid when introduced into the shell. The shell is disclosed as being the outer cover or an inner layer with the outer cover formed to the external surface thereof. The shell varies in thickness from about 0.060 to 0.410 inches in thickness.

Other known attempts to mold layers around a solid center entail placing a preformed center between two blocks of core material in a spherical compression mold, and closing the mold. This is done in the manufacture of golf balls sold by Kamatari. This process, however, provides little control over the ultimate placement of the center within the golf ball core. Large variations in center eccentricities can result.

The prior art also provides for the manufacture of double cover golf balls. This is generally accomplished by injection molding a first and then a second cover layer around a core. This system, however, requires complex injection molds, usually with retractable pins within the mold to properly position the core.

SUMMARY OF THE INVENTION

The invention provides a method for making a golf ball, particularly suited for golf balls that have a multilayer core with a fluid center, and also a golf ball resulting from the inventive process. The method comprises forming a solid or fluid filled inner sphere, and then separately molding from elastomeric material, preferably polybutadiene, core parts, such as hemispherical cups. When the cups are combined a hollow sphere is formed.

The each hemispherical cup has a hemispherical cavity, produced by a protrusion of a mold part. The inner sphere is placed between two cups, which are then joined to form a liquid center shell of the core. When the cups are joined, the hemispherical cavities together form a spherical cavity, now occupied by the inner sphere, and the cups themselves form a liquid center shell of the core. Thus, the inner sphere is easily positioned concentrically within the finished ball. Finally, a cover is molded around the core. This process results in accurate and repeatable central placement of the inner sphere within the core.

The process is not susceptible to unwanted deformation of a soft inner sphere during placement within the cup' cavities because the method does not depend on the rigidity of the inner sphere in the shaping of the cups. Moreover, as the cups are molded separately from the inner sphere, the process avoids deforming a soft inner sphere containing a fluid because compressing the cup material about the inner sphere is not required.

In a method according to the invention, the two cups are molded on both sides of a single protrusive mold part that has a hemispherical protrusion on each side for forming each hemispherical cavity.

Once the cups are formed, they are joined by applying an adhesive between them and pressing them together. The adhesive employed also has an adhesive strength that is preferably stronger than the cohesive strength of the elastomeric core material. The adhesive is preferably flexible in its cured state.

An alternative method to employing adhesive is to join the cups by pressing them together while their temperature is elevated to crosslink the material from one cup to the other.

The invention also provides making hemispherical cups with nonplanar mating surfaces. The mating surfaces are substantially flat in one embodiment, but, in another embodiment, define a pattern that is symmetrical about the inner sphere, such as of concentric ridges that mesh when the two cups are joined. These ridges may comprise a corresponding tongue and groove. The nonplanar surfaces improve the shear strength of the finished ball where the cups are joined and retain more characteristics of the cup material throughout the joining region than do balls with flat mating surfaces.

Properties of golf balls according to the invention, such as spin rate, spin decay, compression, and initial velocity, may be varied, for example by selecting appropriate specific gravities and viscosities of a fluid in the inner sphere. The fluid may have a high specific gravity and low viscosity for a high spin ball or a low specific gravity and high viscosity for a low spin ball. The properties of the liquid center shell or one or more mantle layers in the ball, such as specific gravity, resiliency, and compression can also be varied to make balls having the desired characteristics.

DESCRIPTION OF THE PREFERRED EMBODIMENTS

Figure 1:
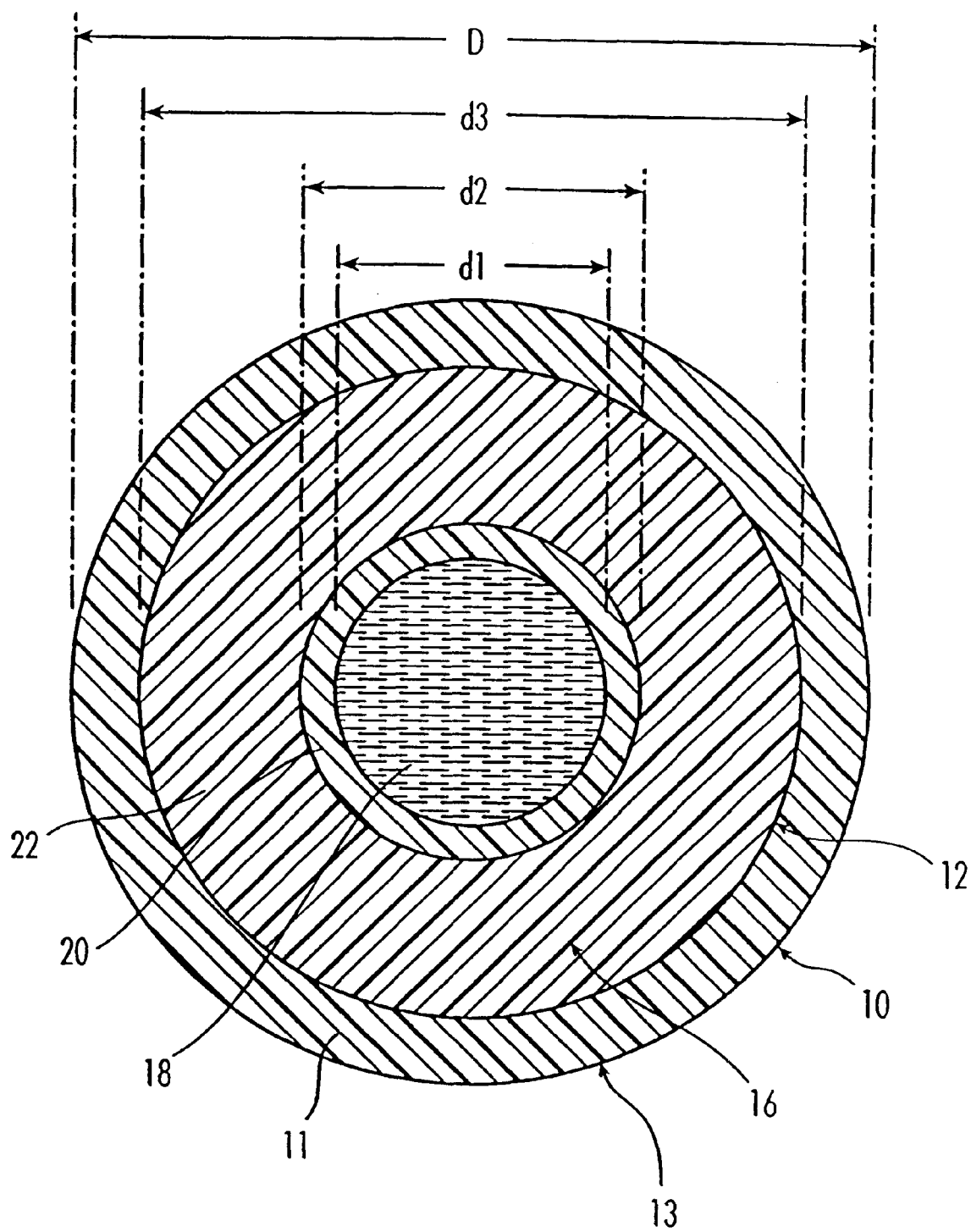
FIG. 1 is a sectional view of a ball of the present invention.
Figure 2:
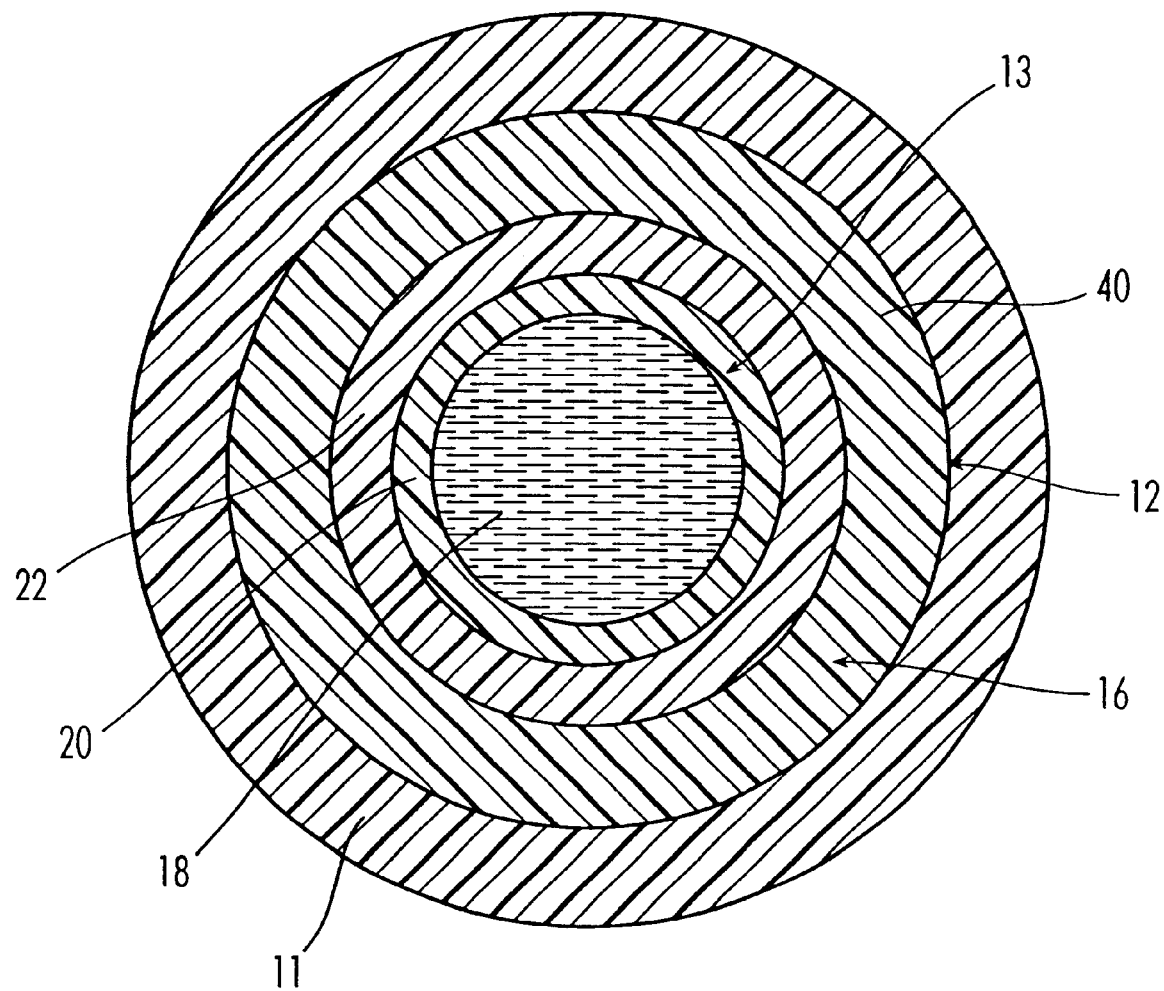
FIG. 2 is a sectional view of a ball according to the present invention with the liquid center shell and multiple mantle and cover layers around an inner sphere.

Referring to FIG. 1, ball 10 includes a cover 11 and a core 12. The core 12 has an inner sphere 13 that is disposed concentrically therein and which comprises a fluid center 18 in a cavity within a liquid center shell 20. The core 12 also has a first mantle layer 22, which surrounds the inner sphere 13. Together, the liquid center shell 20 and the first mantle layer 22 are part of a mantle portion 16 of the ball. The mantle portion 16 of FIG. 2 has an additional second mantle layer 40. The liquid center shell 20 and mantle layers 22 and 40 are preferably elastomers.

The cover 11 provides the interface between the ball 10 and a club and other objects such as trees, cart paths, and grass. Properties that are desirable for the cover are good flowability, high abrasion resistance, high tear strength, high resilience, and good mold release, among others.

The cover 11 can be comprised of polymeric materials such as ionic copolymers of ethylene and an unsaturated monocarboxylic acid which are available under the trademark "SURLYN" of E.I. DuPont De Nemours & Company of Wilmington, Del. or "IOTEK" or "ESCOR" from Exxon. These are copolymers of ethylene and methacrylic acid or acrylic acid partially neutralized with zinc, sodium, lithium, magnesium, potassium, calcium, manganese, nickel or the like.

In accordance with the various embodiments of the present invention, the cover 11 has a thickness to generally provide sufficient strength, good performance characteristics and durability. Preferably, the cover 11 is of a thickness from about 0.03 inches to about 0.12 inches. More preferably, the cover 11 is about 0.04 to 0.09 inches in thickness and, most preferably, is about 0.05 to 0.085 inches in thickness.

In accordance with a preferred embodiment of this invention, the cover 11 can be formed from mixtures or blends of zinc, lithium and/or sodium ionic copolymers.

The Surlyn® resins for use in the cover 11 are ionic copolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This invention can likewise be used in conjunction with homopolymeric and copolymer materials such as:

(1) Vinyl resins such as those formed by the polymerization of vinyl chloride, or by the copolymerization of vinyl chloride with vinyl acetate, acrylic esters or vinylidene chloride.

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.

(3) Polyurethanes such as those prepared from polyols and diisocyanates or polyisocyanates and those disclosed in U.S. Pat. No. 5,334,673.

(4) Polyureas such as those disclosed in U.S. Pat. No. 5,484,870.

(5) Polyamides such as poly(hexamethylene adipamide) and others prepared from diamines and dibasic acids, as well as those from amino acids such as poly (caprolactam), and blends of polyamides with Surlyn, polyethylene, ethylene copolymers, ethyl-propylene-non-conjugated diene terpolymer, etc.

(6) Acrylic resins and blends of these resins with poly vinyl chloride, elastomers, etc.

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly(ether-amide), such as PEBAX sold by ELF Atochem.

(7) Polyphenylene oxide resins, or blends of polyphenylene oxide with high impact polystyrene as sold under the trademark "Noryl" by General Electric Company, Pittsfield, Mass.

(8) Thermoplastic polyesters, such as polyethylene terephthalate, polybutylene terephthalate, polyethylene terephthalate/glycol modified and elastomers sold under the trademarks "Hytrel" by E.I. DuPont De Nemours & Company of Wilmington, Del. and "Lomod" by General Electric Company, Pittsfield, Mass.

(9) Blends and alloys, including polycarbonate with acrylonitrile butadiene styrene, polybutylene terephthalate, polyethylene terephthalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 11 is comprised of polymers such as ethylene, propylene, butene-1 or hexane-1 based homopolymers and copolymers including functional monomers such as acrylic and methacrylic acid and fully or partially neutralized ionomers resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethelyne vinyl alcohol), poly (tetrafluoroethylene) and their copolymers including functional comonomers and blends thereof. Still further, the cover 11 is preferably comprised of a polyether or polyester thermoplastic urethane, a thermoset polyurethane, a low modulus ionomer such as acid-containing ethylene copolymer ionomers, including E/X/Y copolymers where E is ethylene, X is an acrylate or methacrylate-based softening comonomer present in 0–50 weight percent and Y is acrylic or methacrylic acid present in 5–35 weight percent. More preferably, in a low spin rate embodiment designed for maximum distance, the acrylic or methacrylic acid is present in 15–35 weight percent, making the ionomer a high modulus ionomer. In a high spin embodiment, the acid is present in 10–15 weigh percent or a blend of a low modulus ionomer with a standard ionomer is used.

In the mantle portion 16, the liquid center shell 20, and first and second mantle layers 22 and 40 are preferably made of elastomers, such as thermoset rubber, including polyisoprene, styrene butadiene, polybutadiene and combinations thereof; plastic, such as polypropylene; or thermoplastic elastomeric material such as copolymers of methyl-methacrylate with butadiene and styrene, copolymers of methyl-acrylate with butadiene and styrene, acrylonitrile styrene copolymers, polyether-ester, polyether-amide, polyurethane and/or blends thereof. Most preferably, the first and second mantle layers 22 and 40 are made of thermoset rubber or thermoplastic elastomeric materials.

The mantle portion 16 preferably has an outside diameter d3 in the range of 80 to 98% of the finished ball diameter D and an inner diameter d1 in the range of 30 to 70% of the finished ball diameter. Preferably, mantle portion 16 and the liquid center shell 20 have an inner diameter of approximately 0.5 to 1.18 inches and, more preferably, an inner diameter of approximately 0.75 to 1.1 inches. Preferably, the mantle portion 16 and liquid center shell 20 have an inner diameter of approximately 0.9 to 0.95 inches. The first mantle layer 22 preferably has an inner diameter d2 in the range of 0.55 to 1.45 inches and, more preferably, approximately 0.8 to 1.3 inches. Yet further still, the mantle portion 16 has an outside diameter in the range of 1.3 to 1.65 inches and, more preferably, approximately 1.45 to 1.62 inches.

A golf ball incorporating these measurements can be designed with the various attributes discussed below, such as specific gravity, resiliency and hardness, to provide the desired playing characteristics, such as spin rate and initial velocity. More particularly, by using a liquid center shell to surround the fluid center, in an inner sphere, and at least a first mantle layer, the specific gravities and other properties can be tailored to provide optimum playing characteristics. More particularly, by constructing a ball according to these dimensions, the first mantle layer 22 is made with a significant volume compared to the fluid center 18. Preferably, the volume of the first mantle layer 22 is greater than the volume of the fluid center 18. More preferably, the volume of the first layer 22 is about 2 to 4 times the volume of the fluid center 18. Thus, the properties of the first mantle layer can effect the playing characteristics of the ball.

The hardness and resiliency of the mantle portion 16 can be varied to achieve certain desired parameters such as spin rate, compression and initial velocity.

Preferably, the mantle portion 16 has a hardness of approximately 30 to 95 Shore C, and more preferably, 45 to 90 Shore C. Still further, the mantle portion 16 has a resiliency greater than 40 bashore.

In a most preferred embodiment, the liquid center shell 20 is comprised of a plastic material having high temperature resistance. The first mantle layer 22 is comprised of a polybutadiene material that has high specific gravity for a low spin rate ball and a low specific gravity for a high spin rate ball. The specific gravity of the polybutadiene material can be varied by adding fillers known to those skilled in the art.

The fluid center 18 can be a wide variety of materials including solutions such as air, water, glycerine, paste, foams, oils, water solutions such as salt in water, corn syrup, salt in water and corn syrup, or glycol and water. The fluid can also include pastes, colloidal suspensions, such as clay, barytes, carbon black in water or other liquid, or salt in water/glycol mixtures; gels, such as gelatin gels, hydrogels, water/methyl cellulose gels and gels comprised of copolymer rubber based materials such a styrene-butadiene-styrene rubber and paraffinic and/or naphthenic oil; or melts including waxes and hot melts. Hot-melts are materials which at or about normal room temperatures are solid but at elevated temperatures become liquid. The fluid center 18 can also be a reactive liquid system which combine to form a solid. Examples of suitable reactive liquids are silicate gels, agar gels, peroxide cured polyester resins, two part epoxy resin systems and peroxide cured liquid polybutadiene rubber compositions. It is understood by one skilled in the art that other reactive liquid systems can likewise be utilized depending on the physical properties of the liquid center shell and the physical properties desired in the resulting finished golf balls.

The fluid center 18 can be varied to modify the performance parameters of the ball, such as the moment of inertia. Preferably, the fluid center 18 is comprised of a material that has a high specific gravity for high spin rate golf balls and a material that has a low specific gravity for a low spin rate golf ball. Preferably, the specific gravity of the fluid is below or equal to 1.2 for low specific gravity centers and above 1.2 for high specific gravity centers. More preferably, the specific gravity is approximately 1.15–1.2 for low specific gravity centers and approximately 1.3–1.55 for high specific gravity centers. Still further, the fluid is preferably comprised of a material with a low viscosity for a golf ball having a high spin rate and a material having a high viscosity for a golf ball having a low spin rate. Preferably, the viscosity of the fluid center 18 is less than 100 cps for low viscosity centers and greater than or equal to 100 cps for high viscosity centers. More preferably, the viscosity of the fluid center 18 is less than or equal to 10 cps for low viscosity centers and is between 100 and 1500 cps for high viscosity centers. Most preferably, the fluid center 18 viscosity is approximately 500 cps for high viscosity centers.

The core 12 is preferably 60 to 95% of the total ball weight and more preferably, 75 to 86% of the ball weight. As stated above, the weight distribution within the core 12 can be varied to achieve certain desired parameters such as spin rate, compression and initial velocity.

For example, by increasing the diameter of the fluid center 18, and increasing the specific gravity of the mantle portion 16, the weight distribution of the core 12 is moved toward the outer diameter for a lower spin rate ball. In contrast, the diameter of the fluid center 18 can be decreased and the specific gravity of the mantle layer 16 decreased to move the weight distribution of the ball towards the ball center for a high spin rate ball.

Similarly, the specific gravity of the fluid center 18 can be decreased and the specific gravity of the mantle portion 16 increased for a low spin rate ball. Alternatively, the specific gravity of the fluid center 18 can be increased and the specific gravity of the mantle portion 16 decrease for a high spin rate ball.

Various examples of golf ball cores according to the invention are set forth below.

EXAMPLE 1

A core according to the present invention was created having a liquid center, a liquid center shell surrounding the liquid and a first mantle layer surrounding the liquid center shell.

The liquid was a salt, water and corn syrup solution comprised of 40% salt, 30% water and 30% corn syrup. The liquid center had an outside diameter of approximately 0.965 inches.

The liquid center shell was created from a thermoplastic elastomer. The liquid center shell had an outside diameter of approximately 1.125 inches.

The first mantle layer was created from crosslinked polybutadiene. The first layer had an outside diameter of approximately 1.51 inches.

The core weighed 38.9 g and had a PGA compression of less than 60.

EXAMPLE 2

A core according to the present invention was created having a liquid center, a liquid center shell surrounding the liquid and a first mantle layer surrounding the liquid center shell.

The liquid was a salt, water and corn syrup solution comprised of 40% salt, 30% water and 30% corn syrup. The liquid filled center had an outside diameter of approximately 0.938 inches.

The liquid center shell was created from polypropylene. The liquid center shell had an outside diameter of approximately 1.0625 inches.

The first mantle layer was created from crosslinked polybutadiene. The first mantle layer had an outside diameter of approximately 1.51 inches.

The core weighted 33.4 g and had a PGA compression of approximately 60.

EXAMPLE 3

A core according to the present invention was created having a fluid center, a liquid center shell surrounding the fluid and a first mantle layer surrounding the liquid center shell.

The fluid was air. The fluid center had an outside diameter of approximately 0.938 inches.

The liquid center shell was created from polypropylene. The liquid center shell had an outside diameter of approximately 1.0625 inches.

The first mantle layer was created from crosslinked polybutadiene. The first mantle layer had an outside diameter of approximately 1.51 inches.

The core weighted 26 g and had a PGA compression of approximately 87.

Figure 3:
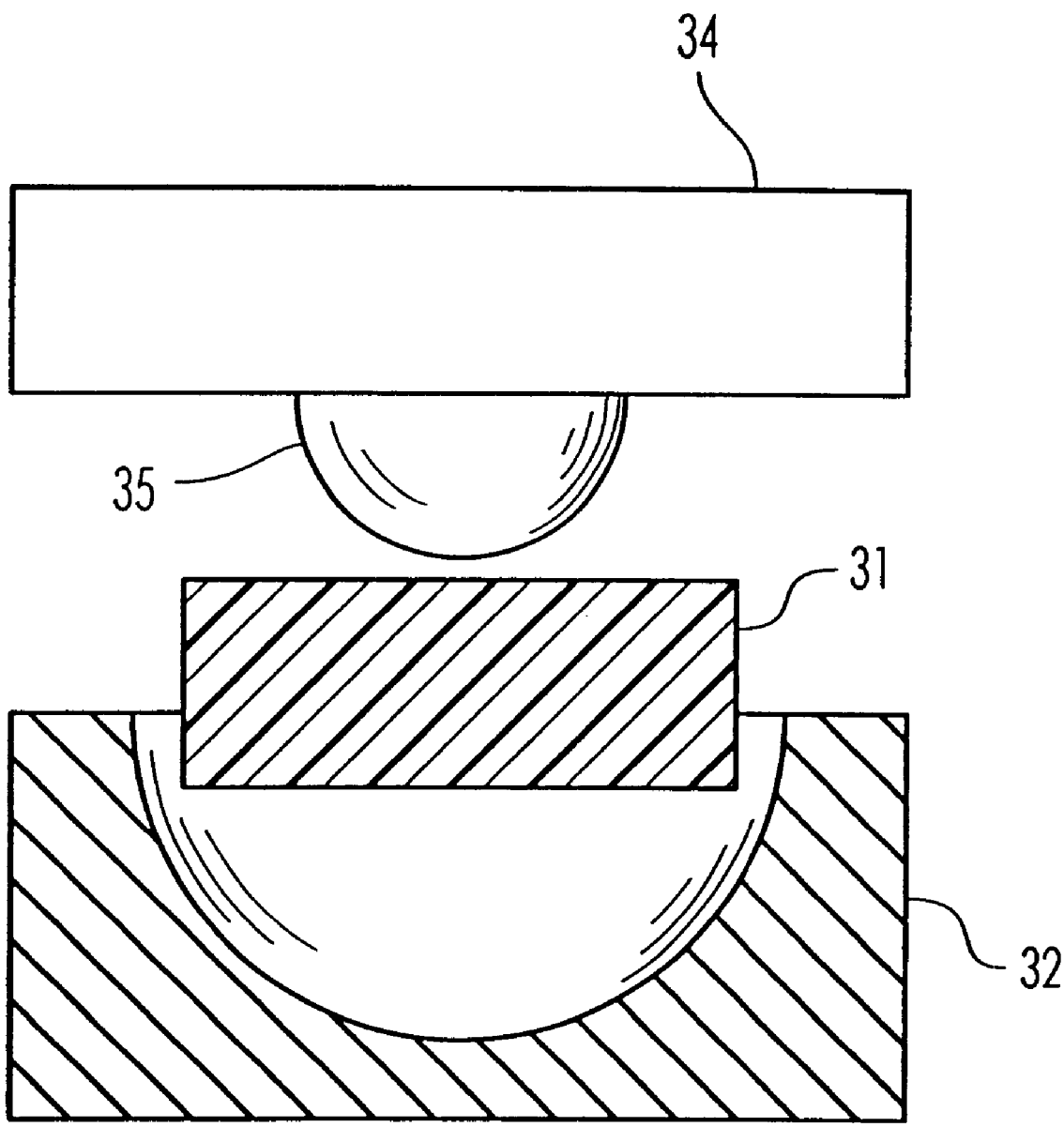
FIG. 3 is a sectional view of a mold performing a single cup.

Turning to the preferred method for making the ball illustrated in FIG. 3, the inner sphere is produced by forming the liquid center shell 20 to create a central cavity, and filling the cavity with the fluid center 18. A first cup is made by compression molding cup material 31, preferably polybutadiene, between a first substantially hemispherical concave mold part 32 and a protrusive mold part 34. The protrusive mold part 34 has a first substantially hemispherical protrusion 35 that faces the first concave mold part 32. A second cup is then made in the same manner.

Figure 4:
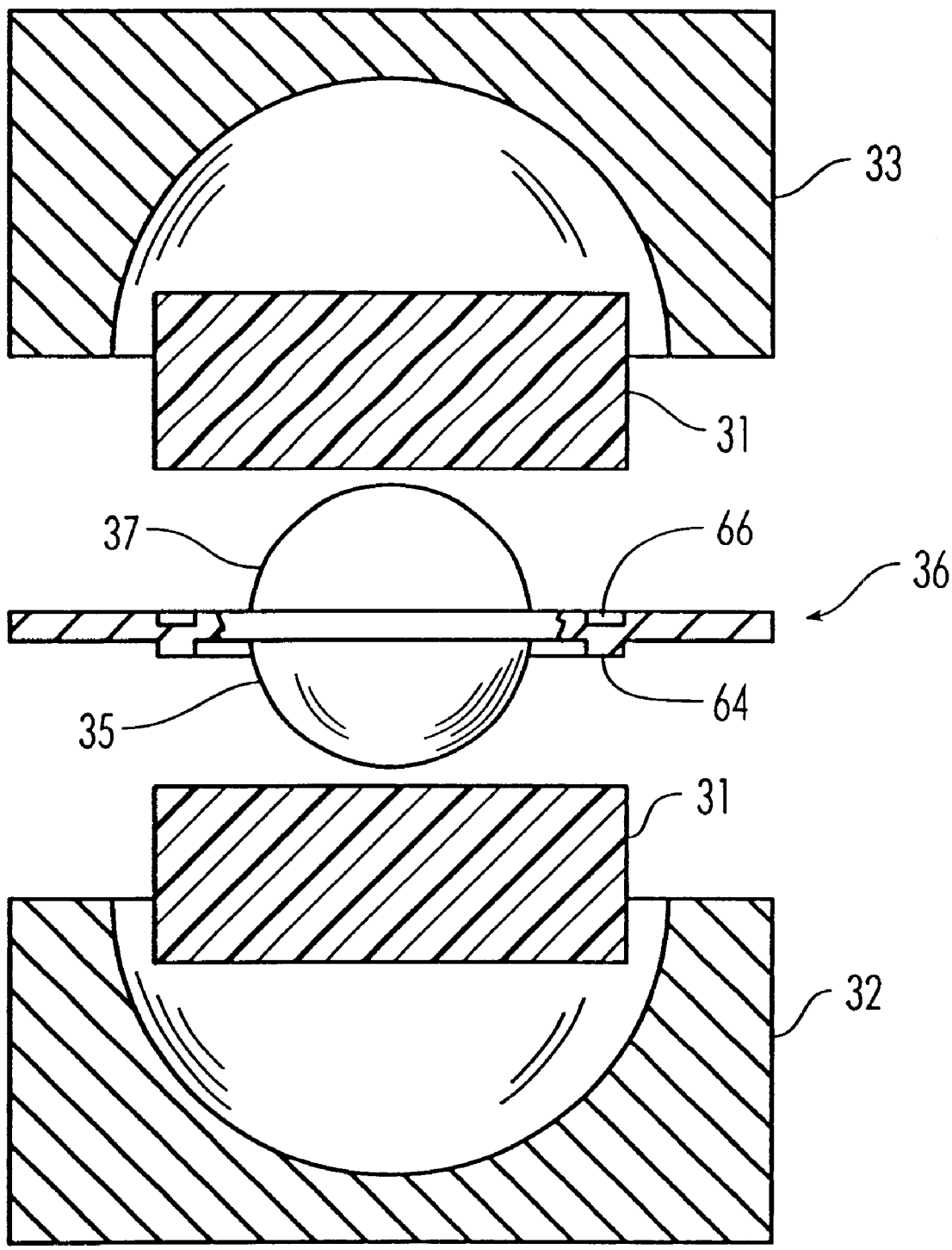
FIG. 4 is a sectional view of molds preforming a mantle layer's cups according to the present invention.

Alternatively, as shown in FIG. 4, the two cups 30 are simultaneously compression molded about a single protrusive mold part 36 that has first and second protrusions 35 and 37. First and second hemispherical molds 32 and 33 are positioned opposite each other and protrusive mold part 36 is placed between the hemispherical molds 32 and 33.

Figure 5:
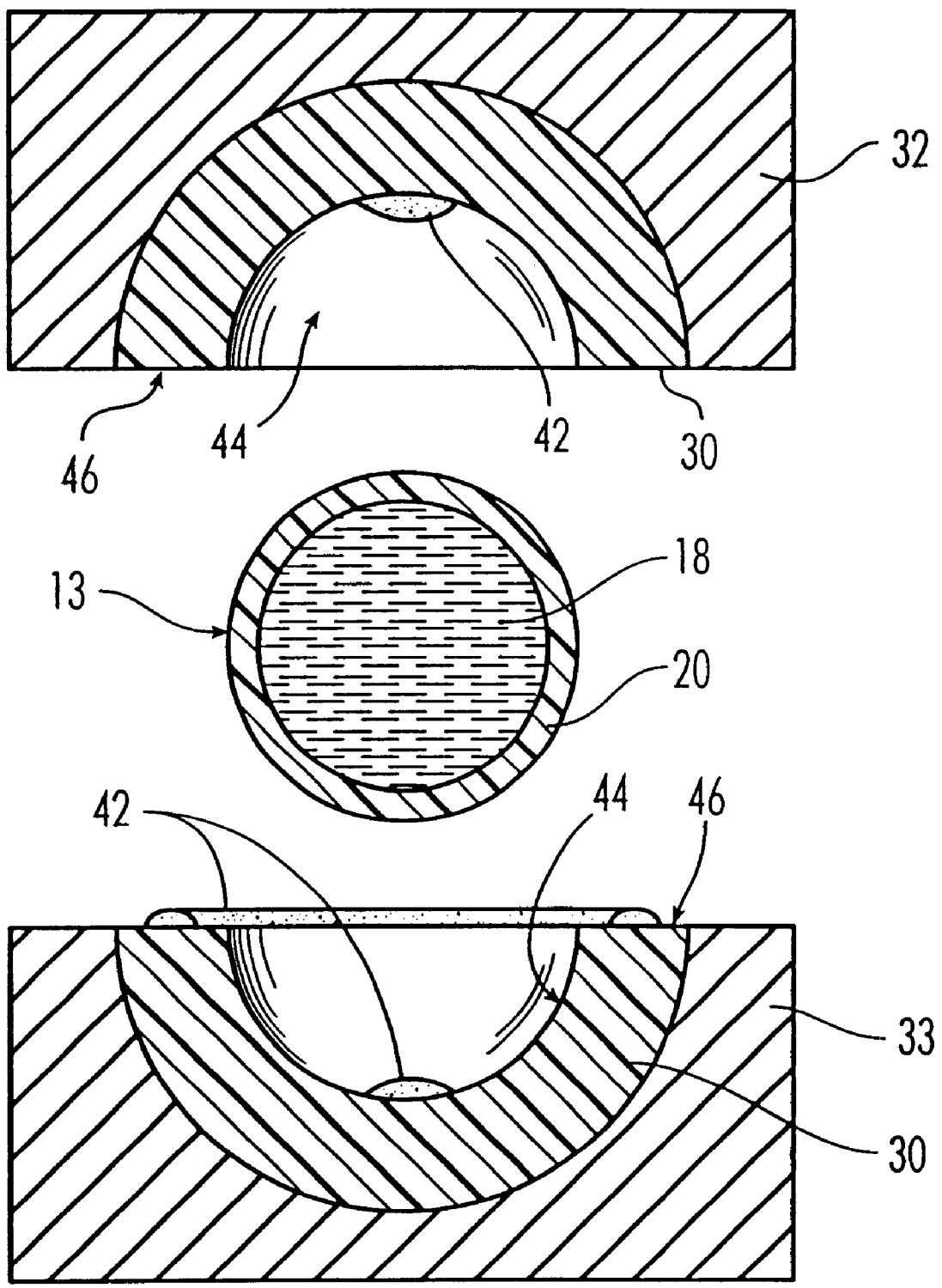
FIG. 5 is a sectional view of molds joining cups of a golf ball mantle layer.

FIG. 5 shows two concave mold parts 32 and 33 after cups 30 have been molded. Each hemispherical cup 30 has a hemispherical cavity 44. Disposed around the cavities 44, the cups 30 have mating surfaces 46, which are substantially flat in this embodiment.

At this point in the process, the inner sphere 13 is placed in the cups 30, and the two cups 30 are joined. Cups 30 are preferably kept in their respective hemispherical molds 32 and 33 during this step. In one embodiment, the method for joining the cups 30 is to place adhesive 42 between the cups by applying the adhesive to one of the cups 30 as shown in FIG. 5. The cups 30 are then brought together, squeezing the adhesive evenly across the mating surfaces of the cups 30. The adhesive 42 then sets and bonds the cups 30 to one another. The adhesive is also preferably applied such that it bonds the inner sphere 13 to the cups 30 by placing adhesive 42 within the cavities. As with the adhesive 42 placed between cups, the adhesive 42 placed between the cups 30 and the inner sphere 13 is spread evenly upon joining the cups 30 to one another. The hemispherical cavities 44 of the joined cups together form a spherical cavity, occupied by the inner sphere 12.

Another method for joining the cups 30 is to compress them together at an elevated temperature to cause crosslinking between the elastomeric cup material of each cup 30. In the embodiment shown in FIG. 4, this may be achieved by removing protrusive mold part 36, and running the compression mold through a second cycle, heating and compressing the cups 30 together.

Figure 6:
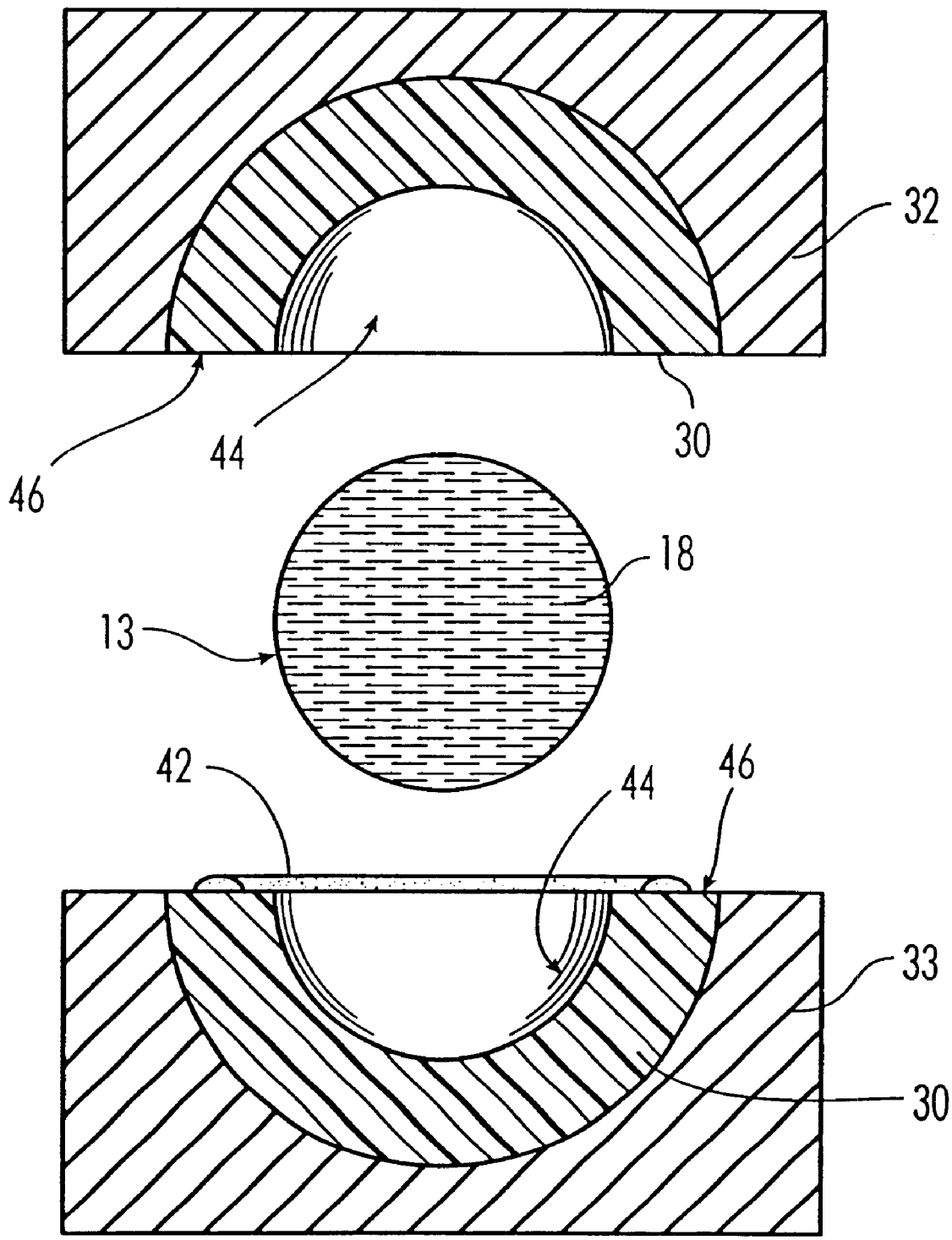
FIG. 6 is a sectional view of the mold joining cups of a golf ball mantle layer around an inner sphere of frozen fluid.

FIG. 6 shows the inner sphere 13 and the cups 30 prior to their being joined. In this embodiment, the inner sphere is merely a sphere of frozen fluid 18 that placed between the cups 30, and around which the cups 30 are joined, preferably before the fluid 18 begins to melt.

Figure 7:
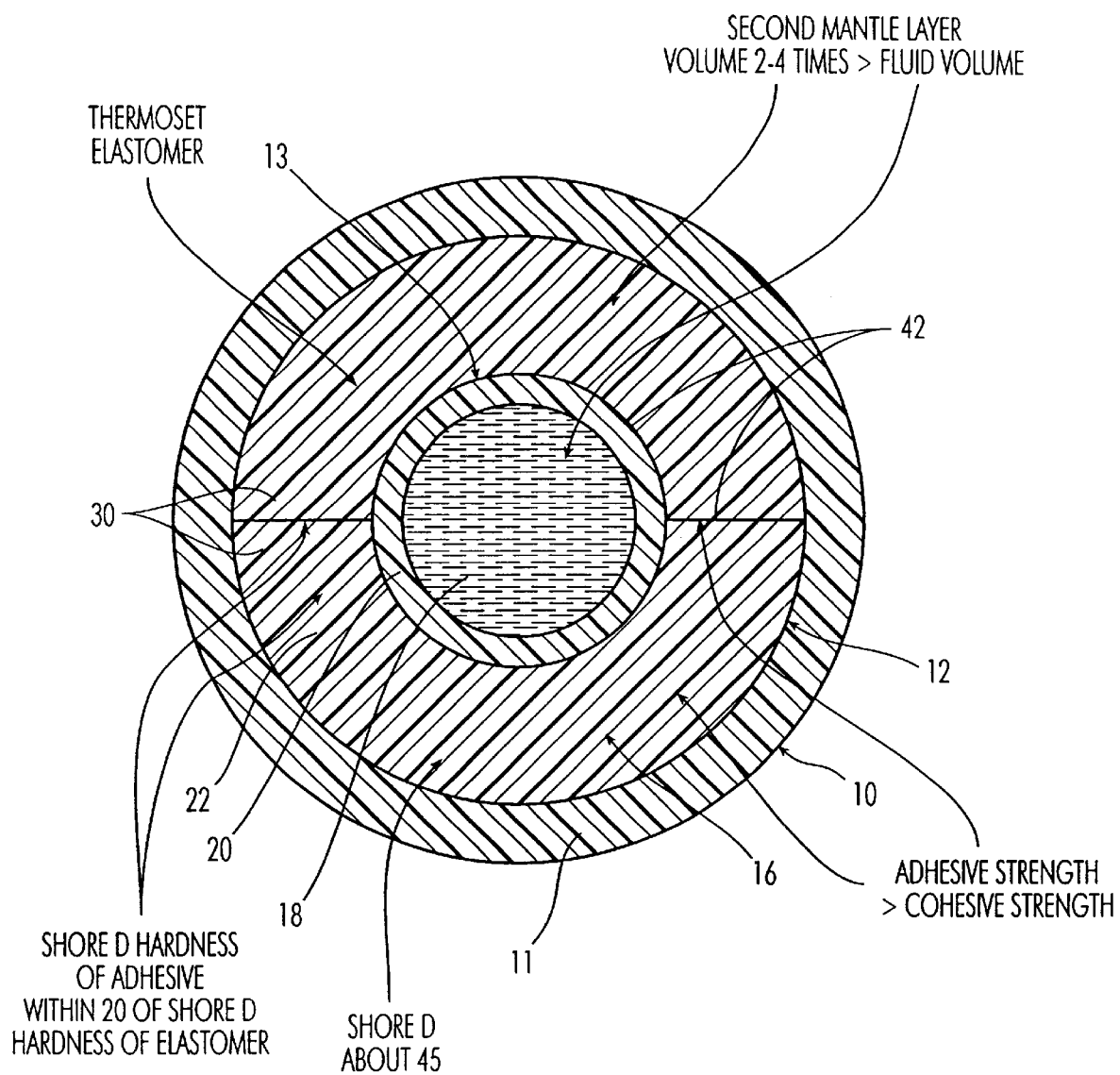
FIG. 7 is a sectional view of a ball according to the invention having adhesive joining the cups.
Figure 8:
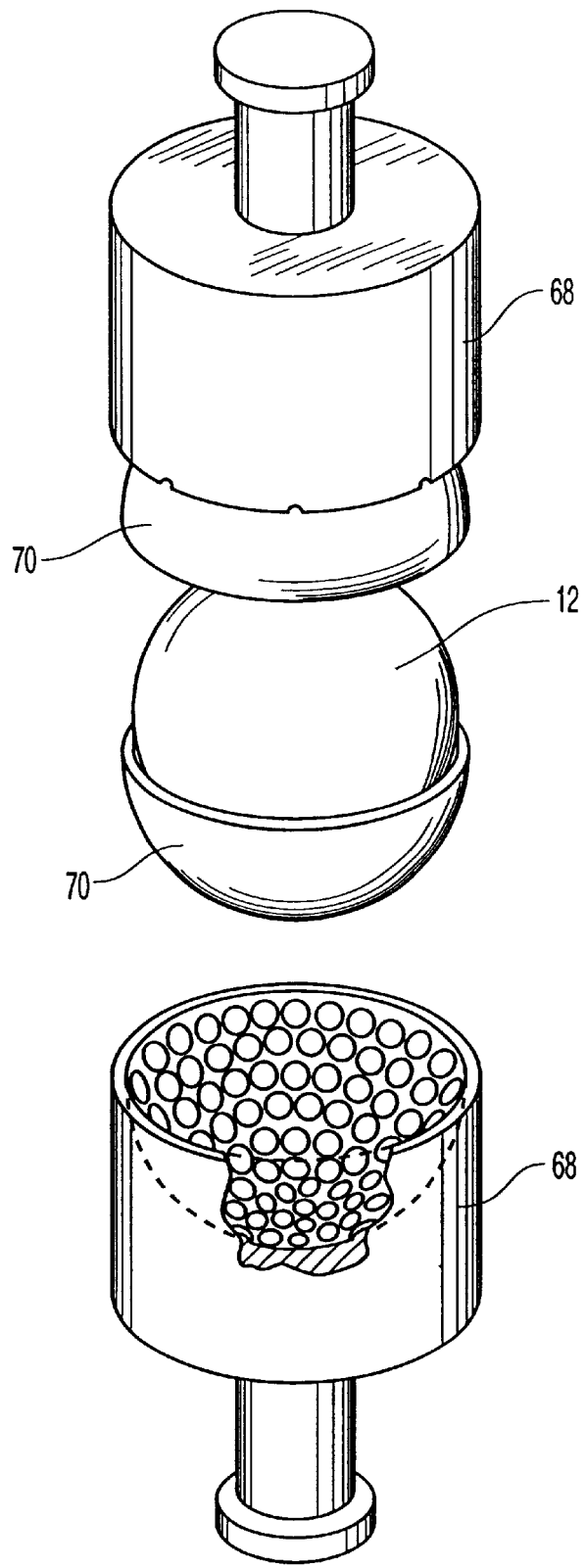
FIG. 8 illustrates a compression mold forming a cover around a golf ball core.
Figure 9:
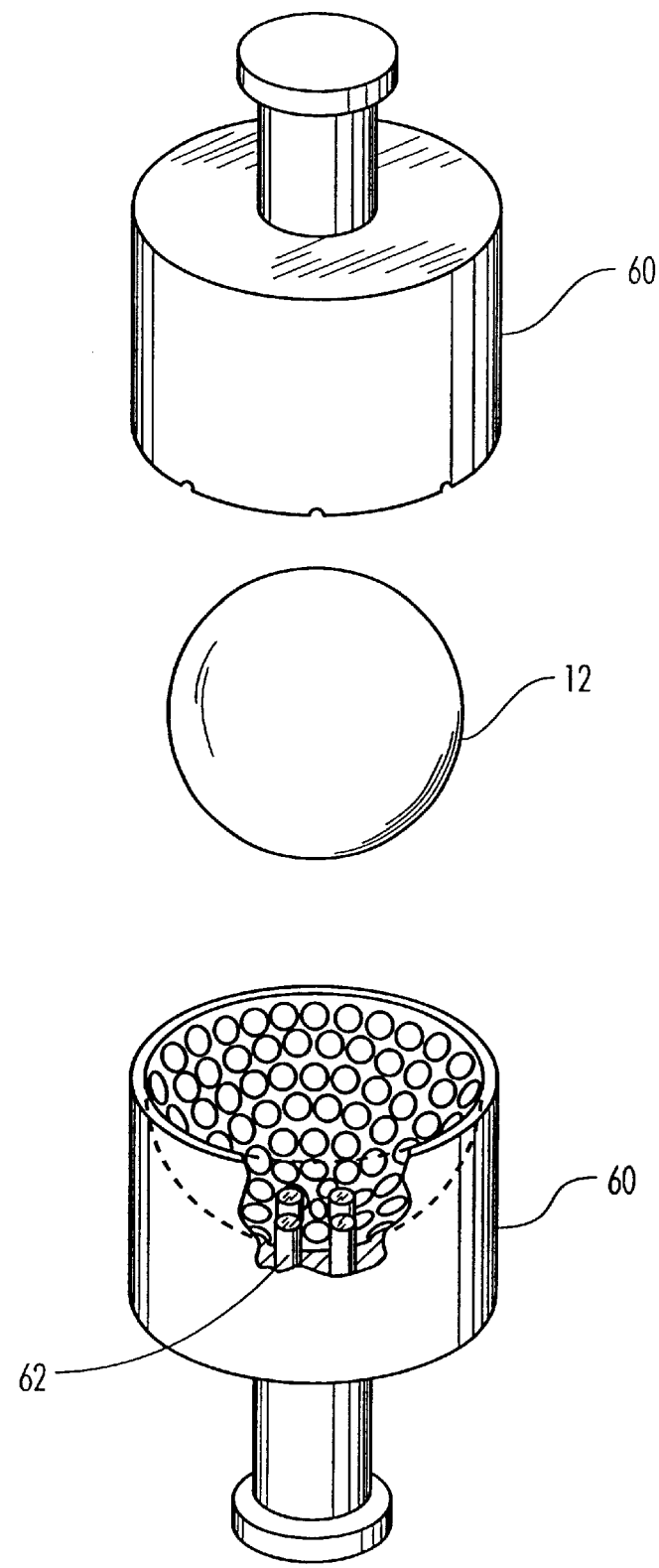
FIG. 9 shows an injection mold forming a cover around a core.

Once the cups 30 are joined, the cover 11 is formed around the core 12, as seen in FIG. 7. FIG. 8 illustrates a step of compression molding two halves 70 of a cover 11 around the core 12 in a dimpled mold 68. FIG. 9 shows a step of injection molding the cover 11 around the core 12 in a dimpled mold 60 with pins 62 that position the core 12 within the dimpled mold 60 and retract before the cover 11 cures completely.

The golf ball of FIG. 7 has been formed by adhesively joining the cups 30. Adhesive 42 extends between the cups in the first mantle layer 22, and between each cup 30 and the inner sphere 13. The adhesive 42 preferably has an adhesive strength that is greater than the cohesive strength of the elastomeric cup material. Thus, a ball can be manufactured that is at least as strong as a ball in which the mantle layer is made from a single piece of cup material, because the elastomer forming the cups 30 will fail under a lighter load than the adhesive 42. Ideally, the adhesive 42 is flexible in its cured state and has physical properties similar to those of the cup material employed.

A preferred adhesive for use with polybutadiene cups 30 is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77° F. for 18 to 24 hours, at 95° F. for 6 hours, at 120° F. for 3 hours, or at 150° F. for 1 hour. The cured adhesive's physical properties resemble those of elastomeric urethane. It exhibits an Izod impact strength of 5.50 ft. lbs./in. of notch, a tensile strength at 25° C. of 2,200 psi, a compressive strength at 25° C. of 6,000 psi, and a shore D hardness of 45. Preferably, the shore D of the cured adhesive is within 20 shore D of the hardness of the elastomeric cup material.

Other preferred adhesives are those adhesives containing cyanoacrylate.

Figure 10:
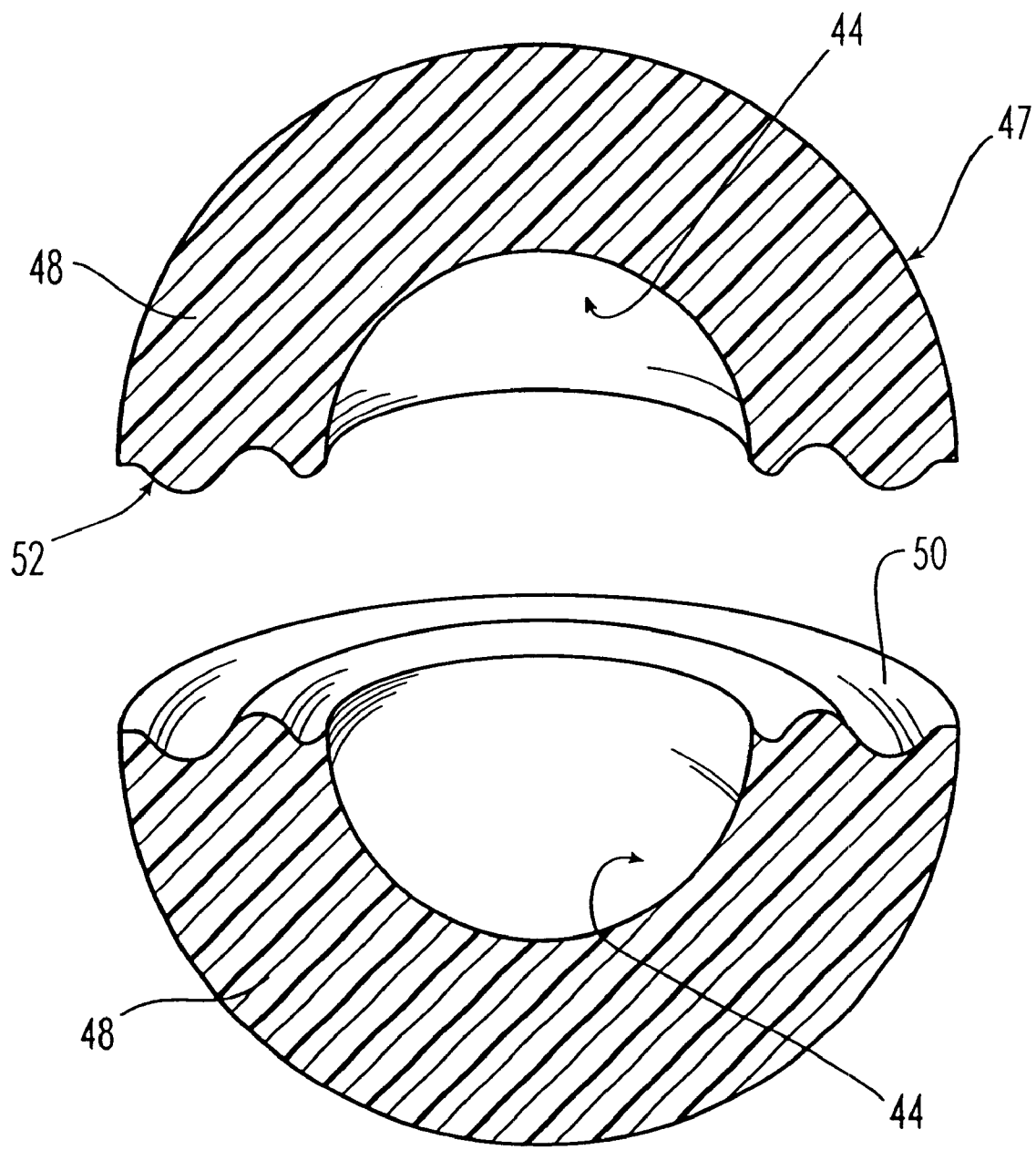
FIGS. 10 and 11 are sectional views of cups with non-planar mating surfaces that mesh with one another.
Figure 11:
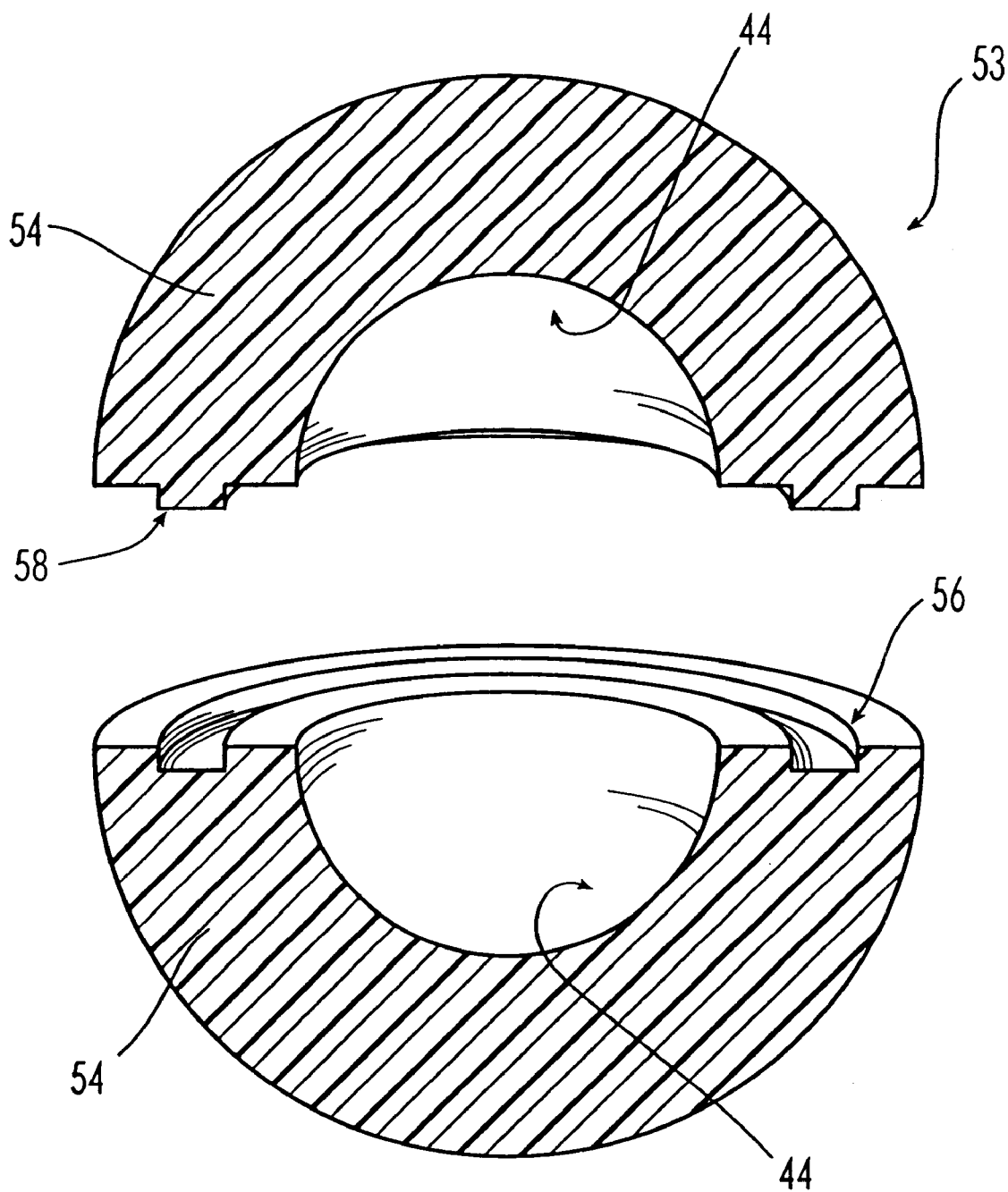

FIGS. 10 and 11 show alternative embodiments of cups 48 and 54. Instead of having flat mating surfaces, cups 48 and 54 have nonplanar mating surfaces 50 and 52, and 56 and 58. These surfaces 50 and 52, and 56 and 58 each have a circular pattern of ridges that is preferably symmetrical about the cavity 44 of each cup 48 and 54; the patterns shown are concentric with the cups 48 and 54. In ball 53, surface 58 has a tongue that engages a groove of surface 56. In the finished golf balls 47 and 53, nonplanar surfaces 50 and 52 are arranged to mesh with each other, as are nonplanar surfaces 56 and 58. These nonplanar mating surfaces 50 and 52 are preferably formed by molding the cups 48 or 54 with protrusive mold parts that have nonplanar surfaces surrounding their protrusions, such as the protrusive mold part 36 with nonplanar surfaces 64 and 66, as shown in FIG. 4.

The liquid center shell and mantle layers in the mantle portion 16 of the golf ball with nonplanar mating surfaces retain more of the properties of the elastomers that form the cups, when the cups are forced in shear with respect to each other, as compared to a golf ball with flat mating surfaces. Nonplanar mating surfaces are thus advantageous when an adhesive is used that has an adhesive strength lower than the cohesive strength of the elastomeric cup material. This is because the meshed portions of the cups 48 and 54 aid in resisting shearing forces between the two cups 48 and 54.

While it is apparent that the illustrative embodiments of the invention herein disclosed fulfills the objectives stated above, it will be appreciated that numerous modifications and other embodiments may be devised by those skilled in the art, for example, a series of progressively larger diameter cups can be formed and joined by the methods disclosed. Therefore, it will be understood that the appended claims are intended to cover all such modifications and embodiments which come within the spirit and scope of the present invention.

What is claimed:

1. A method of making a ball, comprising:
   a) forming an inner sphere by forming an outer shell with a fluid mass center;
   b) forming a plurality of core parts from elastomeric material;
   c) arranging and adhesively joining the core parts around the inner sphere with a flexible adhesive and then crosslinking the core parts to each other by compressing them together at an elevated temperature to form a substantially spherical core;
   d) molding a cover around the assembled core, wherein the elastomeric material has a cohesive strength and the adhesive has an adhesive strength that is stronger than the cohesive strength.

2. The method of claim 1, further comprising molding nonplanar mating surfaces on the core parts, wherein the core parts comprises meshing the mating surfaces.

3. The method of claim 1, wherein forming the inner sphere comprises freezing a sphere of a fluid.

4. The method of claim 1, wherein the forming of the core parts comprises compression molding the core parts.

5. The method of claim 1, wherein:
   a) the forming of the plurality of core parts comprises forming first and second substantially hemispherical cups having cavities; and
   b) the arranging of the core parts comprises placing the inner sphere in said cavities.

6. The method of claim 5, wherein the forming of the cups comprises forming nonplanar corresponding mating surfaces on the cups adjacent the cavities.

7. The method of claim 6, wherein arranging the core parts comprises meshing the mating surfaces.

8. The method of claim 7, wherein the forming of the mating surfaces comprises forming patterns in the mating surfaces that are symmetrical about the cavities of the cups.

9. The method of claim 8, wherein the forming of the patterns comprises forming the mating surfaces into concentric ridges.

10. The method of claim 1, wherein the elastomeric material is selected from the group consisting of thermoset rubber, including polyisoprene, styrene butadiene, polybutadiene and combinations thereof.

11. The method of claim 10, wherein after arranging and adhesively joining the core parts around the inner sphere the method further includes separately molding two substantially hemispherical cups from elastic material for joining over the core.

12. The method of claim 1, wherein the forming of the core parts comprises applying hat and pressure to the core parts from the elastomeric material on opposite sides of a single mold part.

* * * * *